United States Patent [19]

Newkirk

[11] 3,764,150
[45] Oct. 9, 1973

[54] MECHANICAL SEAL FOR A ROTATING SHAFT
[76] Inventor: Roy K. Newkirk, 146 E. 216 St., Torrance, Calif. 90502
[22] Filed: June 27, 1969
[21] Appl. No.: 871,389

Related U.S. Application Data
[63] Substitute for Ser. No. 577,417, Sept. 6, 1966, abandoned.

[52] U.S. Cl. .................................... 277/90, 277/42
[51] Int. Cl. ............................................. F16j 15/36
[58] Field of Search .................. 277/90, 89, 91, 42, 277/88

[56] References Cited
UNITED STATES PATENTS
2,201,188  5/1940  Limpert et al. .................. 277/90 X
2,348,405  5/1944  Odelius ............................. 277/90
2,444,699  7/1948  Hastings et al. ................. 277/90 X
2,722,439  11/1955 Brummer .......................... 277/42
3,049,385  8/1962  Smith ............................. 277/227 X
3,116,066  12/1963 Koppius ........................... 277/91 X FOREIGN PATENTS OR APPLICATIONS
548,051  9/1942  Great Britain ..................... 277/90

Primary Examiner—Samuel B. Rothberg
Attorney—William C. Babcock

[57] ABSTRACT
A mechanical seal particularly adapted for use with a rotating shaft, which shaft extends into the interior of a closed vessel that is maintained at a pressure different from that of the ambient atmosphere, and said seal serves this function even when the shaft undergoes appreciable off-center rotation as well as axial end play.

4 Claims, 3 Drawing Figures

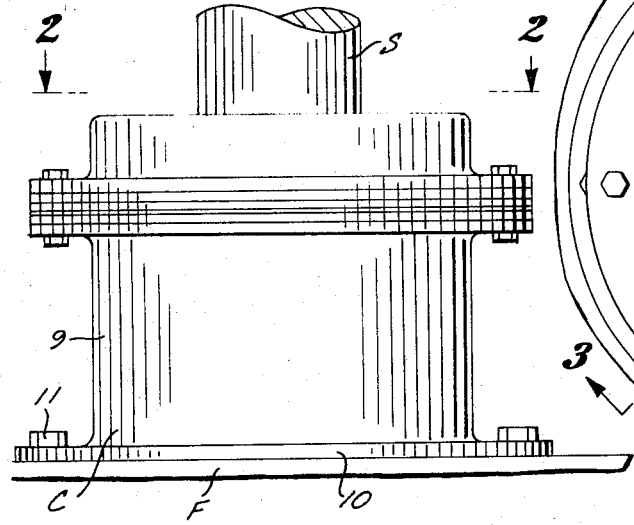
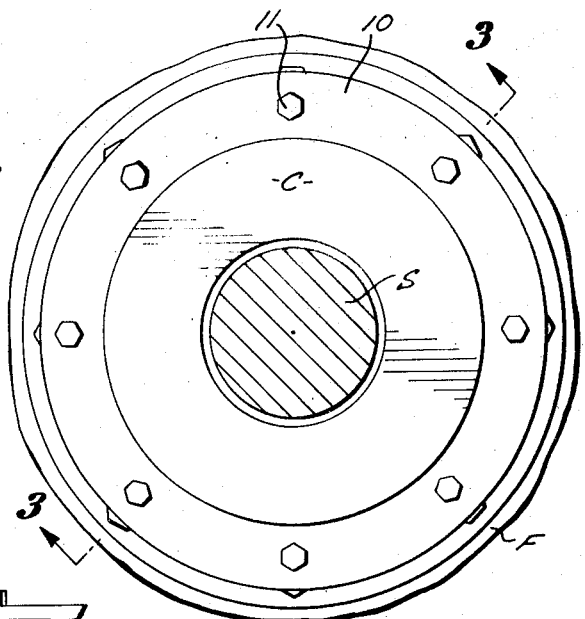
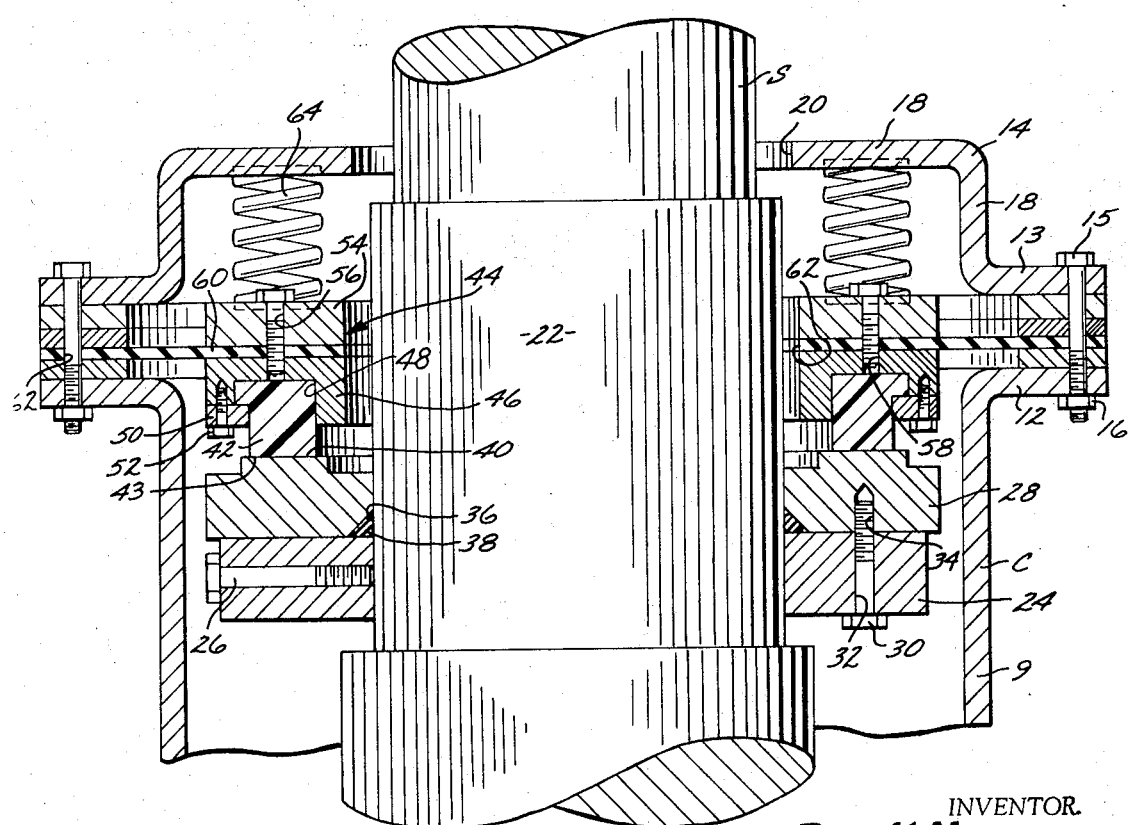

MECHANICAL SEAL FOR A ROTATING SHAFT

CROSS-REFERENCE TO RELATED APPLICATIONS

This is a substitute for "Mechanical Seal for a Rotating Shaft", Ser. No. 577,417 filed Sept. 6, 1966, and now abandoned.

BACKGROUND OF THE INVENTION

1. Field of the Invention

Mechanical seal for rotating shaft.

2. Description of the Prior Art

In the past, the sealing of a rotating shaft that may be subject to off-center rotation as well as axial end play relative to a closed vessel into which the shaft extends has presented numerous technical difficulties. Such difficulties are overcome when the present invention is used in effecting a seal between the rotating shaft and the vessel.

SUMMARY OF THE INVENTION

The present invention provides a seal between a rotating shaft and a case or vessel into which the shaft extends. The invention includes a fixed seal ring supported within the case on an annular support, with the annular support being mounted on a resilient carrier that both carries such support and seals the space between the sleeve and the support. The shaft is provided with a second rotating seal ring and spring means extend between the case and the fixed seal ring for biasing the latter into sealing engagement with the rotating seal ring.

A major object of the present invention is to supply a seal between a rotating shaft and case or vessel, and one that performs the sealing function even if the shaft with which it is associated is subject to off-center rotation and axial end play.

Another object of the present invention is to provide a mechanical seal of the aforedescribed nature of unusually simple and rugged construction. The simplicity of the mechanical seal of the present invention affords a long and trouble-free service life as well as a low initial cost.

BRIEF DESCRIPTION OF THE DRAWING

FIG. 1 is a top plan view of a preferred form of mechanical seal embodying the present invention;

FIG. 2 is a horizontal sectional view taken on line 2—2 of FIG. 1; and

FIG. 3 is a broken vertical sec-tional view taken on enlarged scale along line 3—3 of FIG. 2.

DESCRIPTION OF THE PREFERRED EMBODIMENT

Referring to the drawings, a preferred form of mechanical seal embodying the present invention is adapted for use with a rotating shaft S. Although shaft S is shown extending vertically, it would be understood that the seal of the present invention may also be employed with horizontally extending shafts. Shaft S is coaxial with and extends through a generally cylindrical case C that is attached to the frame F from which shaft S extends. The case of vessel C will in many instances have an interior in which either a vacuum or pressure is maintained that is substantially different from that of the ambient atmosphere. The shaft S may be assumed as forming part of a mechanism utilizing rotating parts, such mechanism being disclosed within frame F, but not shown.

More particularly, and with reference to the other drawing figures, the seal case C includes a sleeve 9 provided with a lower radially outwardly extending flange 10 that is removably secured to frame F by a plurality of bolts 11. A radially outwardly extending flange 12 formed on the upper end of the sleeve 9 is secured to a complementary flange 13 formed on the bottom of a cover 14 by means of a plurality of like bolts 15 and nuts 16. Cover 14 is of inverted generally cup-like configuration having a top wall 18 formed with a bore 20 coaxial with shaft S.

Within the confines of case C shaft S is provided with an annular collar 24. The collar 24 is locked to the shaft 22 by a set screw 26. The collar 24 supports a rotating seal ring 28 by means of one or more screws or bolts 30. The bolts 30 extend upwardly through one or more vertical bores 32 in collar 24 to an aligned vertical bore 34 formed in rotating seal ring 28, bore 34 being internally threaded. Preferably, the lower radially inner portion of rotating seal ring 28 is cut away so as to define a generally triangular pocket 36 that receives an O-ring 38, the O-ring 38 being compressed into sealing engagement with the shaft 22. The upper surface of the rotating seal ring 28 is formed with an upwardly facing sealing surface 40. Seal ring 28 is slidable relative to shaft S whereby it may be readily replaced when worn.

A fixed seal ring 42 is supported above the rotating seal ring 28. The underside of fixed seal ring 42 defines a downwardly facing sealing surface 43. Preferably, the fixed seal ring 42 is formed of a tough, long-wearing synthetic plastic having low frictional characteristics, such as tetrafluoro-ethylene resin, while the sealing surface 40 of the rotating seal ring is formed of a hard surface, such as a hard facing material, as for example Stellite.

The fixed seal ring 42 is carried by an annular support generally designated 44. The annular support 44 includes a lower section 46 provided with a pocket 48 wherein the sealing ring 42 is removably secured by means of an annular retainer 50. The retainer 50 is secured to the radially outer lower portion of section 46 by means of a plurality of screws or bolts 52. The upper section 54 of the annular support 44 is formed with a plurality of vertically extending bores 56 that are vertically aligned with complementary bores 58 formed through the upper portion of lower section 46, the latter bores 58 being internally threaded. A number of bolts 59 extend downwardly through bores 56 to threadedly engage bores 58.

The annular support 44 is coaxially supported relative to case C by means of a carrier member 60 formed of a resilient fluid-tight material, such as Neoprene or other synthetic rubber, having a fiber filler. The carrier 60 is of generally ring-like configuration having a central circular opening 62 of greater inner diameter than the outer diameter of shaft boss 22 and corresponding to the inner diameter of annular support 44. The annular support 44 is rigidly affixed to the carrier 60 by means of the aforementioned bolts 59, the radially inner portion of such carrier being sandwiched between the underside of upper section 54 and the upper surface of lower section 46. The radially outer portion of the carrier 60 is provided with bores 62 through which extend the aforementioned bolts 15.

A plurality of axially extending coil compression springs 64 extend vertically between the underside of cover top wall 18 and the upper surface of the upper section 54 of annular support 44. These springs 64 constantly bias the annular support 44 and hence the fixed sealing 42 downwardly whereby the sealing surface 43 of fixed seal ring 42 is maintained in sealing engagement with the sealing surface of rotating seal ring 28.

In the operation of the aforedescribed seal, durong rotation of the shaft S relative to the frame F, the fixed and rotating seal rings 28 and 42 will cooperate with carrier 60 to restrain outward fluid leakage along the shaft S. It is important to note that the provision of the resilient carrier 60 also insures that this sealing function remains effective even though the shaft S undergoes considerable off-center rotation and/or axial end-play. In this regard the springs 64 should be of sufficient length to insure that the fixed seal ring 42 will always remain biased against the rotating seal ring 28 even during the course of appreciable shaft axial end-play. It should also be noted that the radial width of the sealing surface 40 of the fixed seal ring 28 should be sufficiently greater than that of the sealing surface 43 of the fixed seal ring 42 that the entire width of the latter will always remain in engagement with a corresponding width of the sealing surface 40. It is an advantage of the aforedescribed seal that both the rotating and the fixed seal rings may be readily replaced when worn. The use of tetrafluoro-ethylene resin for the fixed seal ring 42 is particularly desirable since material of this character is known to have little or no extruding ability while providing long wearing characteristics.

CLAIMS:

1. In combination with a cylindrical case having a flange extending outwardly from a first end thereof through which a shaft of substantially smaller transverse cross section than that of said flange extends a seal operatively associated with said shaft and vessel for maintaining a differential in pressure between the ambient atmosphere and an interior portion of said case, which seal includes:
   a. an inverted cup-shaped cover that has a flange extending outwardly therefrom that is disposed adjacent said flange on said case, said cover having a bore therein of substantially greater cross section than the transverse cross section of said shaft and through which bore said shaft extends;
   b. a flat resilient annular-shaped carrier member that has the peripheral edge portion thereof sandwiched between said flanges, said carrier member having a central opening thereof of substantially greater diameter than that of said shaft and through which opening said shaft extends;
   c. first means for removably and sealingly holding said peripheral edge portion of said carrier member between said flanges;
   d. a rigid ring-shaped first support secured to said carrier member adjacent said opening and extending outwardly therefrom;
   e. a plastic sealing ring removably and sealingly secured to the portion of said support most remote from said cover;
   f. a collar rigidly secured to said shaft;
   g. a ring-shaped sealing member that encircles said shaft and pressure contacts said collar and said sealing ring, said sealing member having an inner tapered face that cooperates with said shaft and collar to define a circumferentially extending pocket;
   h. a resilient ring disposed in said pocket that effects a seal between said sealing member and said shaft;
   i. bolt means for connecting said collar and sealing member to prevent relative rotation therebetween; and
   j. compressed spring means for exerting a force on said sealing ring secured to said support in a direction to maintain said sealing ring in pressure sealing contact with said sealing member to provide a seal between the ambient atmosphere and the interior of said case as said shaft rotates, even though said shaft may move longitudinally and transversely within limited degrees relative to said case when so rotating.

2. A seal as defined in claim 1 which in addition includes:
   k. a second ring-shaped support secured to the side of said carrier member opposite that to which said first ring-shaped support is secured and which second support has said sealing ring secured thereto, and said second ring-shaped support receiving a force from said spring means in a direction to maintain said sealing ring in sealing contact with said sealing member.

3. A seal as defined in claim 2 in which said spring means are a plurality of circumferentially spaced compressed helical springs that have the ends thereof in abutting contact with said cover and said rigid ring-shaped first support.

4. A seal as defined in claim 2 in which said resilient carrier is formed of a synthetic rubber having a fiber filler.

* * * * *